US010832727B2

(12) United States Patent
Yamada

(10) Patent No.: US 10,832,727 B2
(45) Date of Patent: Nov. 10, 2020

(54) INFORMATION PROCESSING APPARATUS

(71) Applicant: CANON KABUSHIKI KAISHA, Tokyo (JP)

(72) Inventor: Ryohei Yamada, Matsudo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/520,222

(22) Filed: Jul. 23, 2019

(65) Prior Publication Data
US 2020/0043525 A1 Feb. 6, 2020

(30) Foreign Application Priority Data

Jul. 31, 2018 (JP) ................................. 2018-143936

(51) Int. Cl.
G11B 5/09 (2006.01)
G11B 20/12 (2006.01)

(52) U.S. Cl.
CPC ............ G11B 20/1217 (2013.01); G11B 5/09 (2013.01); G11B 2020/1232 (2013.01)

(58) Field of Classification Search
None
See application file for complete search history.

(56) References Cited

U.S. PATENT DOCUMENTS 6,289,416 B1* 9/2001 Fukushima ............ G06F 3/0607
710/56
6,636,985 B1 10/2003 Ono
2003/0185394 A1* 10/2003 Ohbi ..................... G11B 19/122
380/201
2003/0191982 A1* 10/2003 Arakawa ............ G11B 20/1883
714/6.13
2004/0156060 A1* 8/2004 Ikeda ................... H04N 1/4092
358/1.9
2006/0013118 A1* 1/2006 Ishida ................ G11B 7/00736
369/275.3
2007/0086106 A1* 4/2007 Hashimoto .......... G11B 27/105
360/75
2008/0239537 A1* 10/2008 Mori .................. G11B 20/1816
360/31
2009/0037654 A1* 2/2009 Allison ................. G06F 21/552
711/112
2020/0043525 A1* 2/2020 Yamada ............. G11B 20/1217

FOREIGN PATENT DOCUMENTS

JP 2001-005616 A 1/2001

* cited by examiner

Primary Examiner — Peter Vincent Agustin
(74) Attorney, Agent, or Firm — Canon U.S.A., Inc. IP Division

(57) ABSTRACT

A setting unit is configured to set first write processing for writing second data in a hard disk, or second write processing for writing the second data in the hard disk and reading data that is written by writing of the second data, and a change unit is configured to change the write processing set in the setting unit. The change unit changes the write processing set in the setting unit from the first write processing to the second write processing, based on determination that the first data is greater than or equal to a threshold by a determination unit.

15 Claims, 10 Drawing Sheets

FIG.3

| ID | ITEM NAME | CURRENT VALUE | WORST VALUE | THRESHOLD | RAW DATA |
|---|---|---|---|---|---|
| 01 | ALTERNATIVE PROCESSING SECTOR COUNT | 100 | 100 | 3000 | 0000 |
| 02 | ALTERNATIVE PROCESSING PENDING SECTOR COUNT | 100 | 100 | 0 | 0000 |
| 03 | SECTOR ALTERNATIVE PROCESSING OCCURRENCES COUNT | 100 | 100 | 0 | 0000 |
| 04 | UNCORRECTABLE SECTOR COUNT (BAD SECTOR) | 100 | 100 | 0 | 0000 |
| 05 | POWER ON/OFF COUNT | 50 | 50 | 0 | 1E0 |
| 06 | POWER-OFF MAGNETIC HEAD RETRACT COUNT | 200 | 200 | 100000 | 23DE |
| 07 | LOAD/UNLOAD COUNT | 200 | 200 | 100000 | 11EE |
| 08 | POWER-ON HOUR(S) | 100 | 100 | 10000 | 0000 |
| 09 | HEAD OPERABLE STATE TOTAL TIME (CORRESPONDING TO LOAD TIME) | 100 | 100 | 10000 | 0000 |

INFORMATION PROCESSING APPARATUS

BACKGROUND

Field of the Disclosure

The present disclosure relates to an information processing apparatus.

Description of the Related Art

In recent years, a hard disk drive (HDD) used for a multifunction peripheral (MFP) has been configured to store data including system data, such as a driver necessary for system startup of the MFP, and job-related data.

The HDD writes data in a storage area using a magnetic head. In a case where dust is attached to the magnetic head, writing in a sector with a sufficient charge amount may fail when write processing (Write) is performed (WeakWrite).

The charge amount for the data written by this WeakWrite is small. Because the charge amount is small, this data cannot be normally read, and thus a readout error occurs when an attempt to read this data is made. The sector in which such data is stored is handled as a bad sector. For example, in Japanese Patent Application Laid-Open No. 2001-5616, a bad sector on a disk is found by performing a read test when an HDD is in a standby state, and an alternative sector prepared beforehand is allocated as an alternative to this bad sector. Further, an abnormality of a magnetic head is notified to a user by performing a write test.

However, if many bad sectors occur, alternative sectors prepared beforehand may not be sufficient. In such a case, a bad sector may be accessed and therefore reading normal data may fail when a hard disk is used. This may lead to such a situation that normal data cannot be read out, and thus an error failure is displayed for HDD replacement during reading of a driver necessary for system startup or printing of image data saved in a user area.

Meanwhile, WriteVerify is known as one type of write processing for an HDD. The WriteVerify is the write processing for performing readout for confirmation when data is written in a storage area. In the WriteVerify, a magnetic head is moved to perform reading after performing the write processing, based on the specification of the HDD. Therefore, according to the WriteVerify, even if dust is attached to the magnetic head due to the movement of the magnetic head, the dust can be removed by the movement of the magnetic head. In other words, occurrence of an unusable sector due to the WeakWrite can be suppressed.

SUMMARY

According to an aspect of some embodiments, an information processing apparatus includes a hard disk, and further includes a storage unit configured to store at least sector information of the hard disk, the sector information including first data about a sector replaced with an alternative sector, a determination unit configured to compare the first data about the sector replaced with the alternative sector and a threshold corresponding to the first data and thereby determine whether the first data is greater than or equal to the threshold, a setting unit configured to set first write processing for writing second data in the hard disk, or second write processing for writing the second data in the hard disk and reading data that is written by writing of the second data, and a change unit configured to change the write processing set in the setting unit, wherein the change unit changes the write processing set in the setting unit from the first write processing to the second write processing, based on determination that the first data is greater than or equal to the threshold by the determination unit.

Further features of various embodiments will become apparent from the following description of exemplary embodiments with reference to the attached drawings.

BRIEF DESCRIPTION OF THE DRAWINGS

FIG. 3 is a diagram illustrating Self-Monitoring, Analysis and Reporting Technology (SMART) information.

DESCRIPTION OF THE EMBODIMENTS

Figure 1:
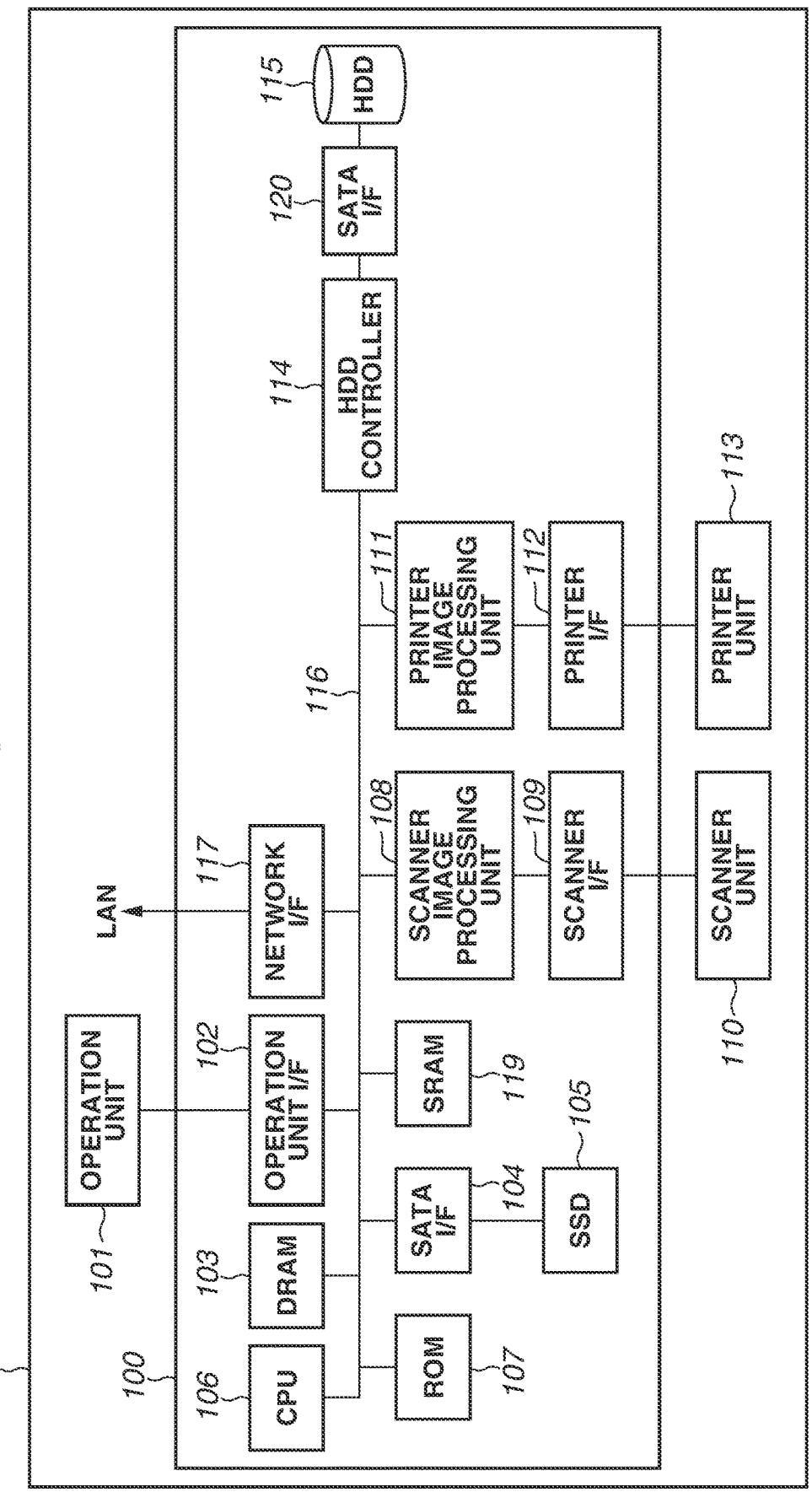
FIG. 1 is a block diagram illustrating a system control configuration of an information processing apparatus.

FIG. 1 is a block diagram illustrating a system control configuration of an information processing apparatus 200 in a first exemplary embodiment.

The information processing apparatus 200 includes a system control controller 100 that implements a controller function.

The system control controller 100 is electrically connected to an operation unit 101, a scanner unit 110, and a printer unit 113. Further, the system control controller 100 can communicate image data and device information with a personal computer or an external apparatus via a local area network (LAN) using a network interface (I/F) 117.

The system control controller 100 includes a central processing unit (CPU) 106, a dynamic random access memory (DRAM) 103, a read only memory (ROM) 107, a Serial AT Attachment (SATA) I/F 104, a solid-state drive (SSD) 105, an operation unit I/F 102, and a static random access memory (SRAM) 119. The system control controller 100 further has the network I/F 117. Furthermore, the system control controller 100 includes a scanner image processing unit 108, a scanner I/F 109, a printer image processing unit 111, a printer I/F 112, a hard disk drive (HDD) controller 114, a SATA I/F 120, and an HDD 115.

The CPU 106 controls the entire information processing apparatus 200 by executing a software program stored in the DRAM 103 to be described below.

The ROM 107 stores, for example, a boot program and fixed parameters. The ROM 107 also stores control commands for the HDD 115. The control commands for the HDD 115 may be stored in the SSD 105 to be described below or may be stored in the SRAM 119 to be described below.

When the CPU 106 controls the information processing apparatus 200, the DRAM 103 is used for storage of a program and temporary data. The program and the data stored in the DRAM 103 are deleted by power off.

The SRAM 119 stores information such as attribute information.

The SRAM 119 is backed up by a battery to hold the stored contents even after power off.

The HDD 115 is a main storage that stores a program to be executed by the CPU 106 and various kinds of data. The system control controller 100 is in an energized state when the HDD 115 is in a standby state.

The HDD controller 114 is connected to the HDD 115 via the SATA I/F 120. The HDD controller 114 controls the HDD 115 to perform read processing and write processing.

The SSD 105 stores a program to be executed by the CPU 106. The SSD 105 is connected to a system bus 116 via the SATA I/F 104.

The operation unit I/F 102 is an interface that connects the system bus 116 and the operation unit 101. The operation unit I/F 102 receives image data to be displayed at the operation unit 101 from the system bus 116, and outputs the received image data to the operation unit 101. Further, the operation unit I/F 102 outputs information input from the operation unit 101, to the system bus 116. The network I/F 117 is an interface that connects the LAN and the system bus 116.

The scanner unit 110 generates image data by reading at least one document. The generated image data is transmitted to the scanner image processing unit 108 via the scanner I/F 109. The image data processed by the scanner image processing unit 108 is transmitted to the DRAM 103 to be stored therein. The image data is subjected to image processing as necessary, and then stored again into the DRAM 103. The stored image data is transferred from the DRAM 103 to the HDD controller 114.

The image data is transmitted to the printer image processing unit 111. The image data processed by the printer image processing unit 111 is transmitted to the printer unit 113 via the printer I/F 112.

The printer unit 113 prints the image data received via the printer I/F 112 on a sheet.

Figure 2:
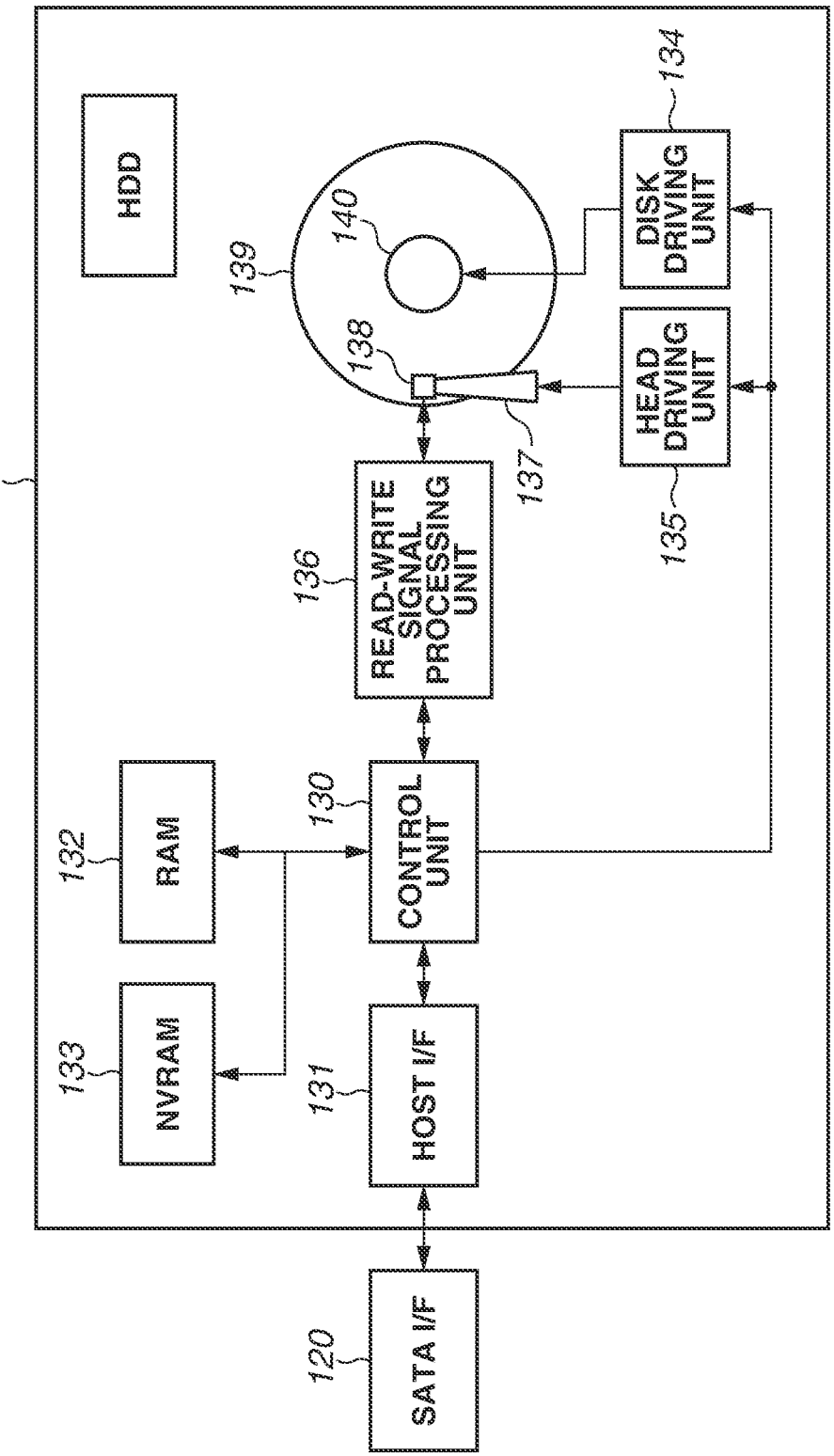
FIG. 2 is a diagram illustrating an inner configuration of a hard disk drive (HDD).

FIG. 2 is a diagram illustrating an inner configuration of the HDD 115.

The HDD 115 includes a control unit 130, a host I/F 131, a RAM 132, and a non-volatile RAM (NVRAM) 133. The HDD 115 further has a disk driving unit 134, a head driving unit 135, a read-write signal processing unit 136, an arm 137, a magnetic head 138, a magnetic disk 139, and a spindle motor 140.

The host I/F 131 is a module that communicates with the HDD controller 114 via the SATA I/F 120. In this example, a SATA interface is used as the host I/F 131.

The control unit 130 controls processing such as the read processing, the write processing, and alternative sector processing of the HDD 115.

The NVRAM 133 stores Self-Monitoring, Analysis and Reporting Technology (SMART) information 40. The SMART information 40 includes parametric information about the HDD 115, such as the number of rotations of the HDD 115, a load/unload count, sector information, such as the number of sectors already subjected to alternative processing, the duration of use of the HDD 115, a power on/off count, power-on hour(s), and a load time. FIG. 3 illustrates a specific example. In a case where a threshold is data not included in the SMART information 40, the data is separately stored.

Figure 9A:
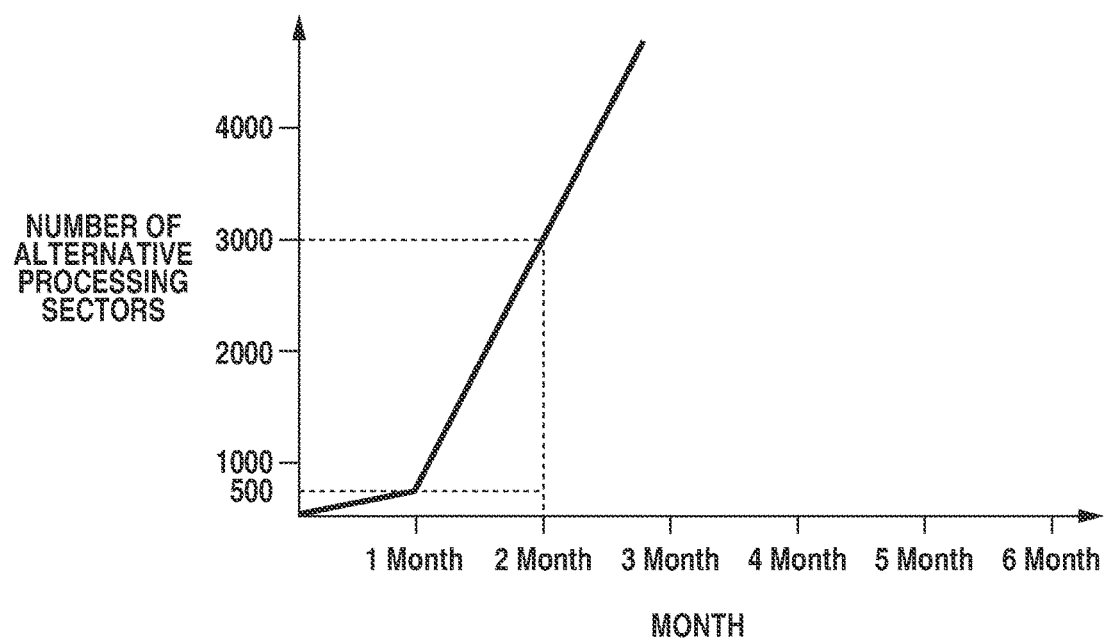
FIGS. 9A and 9B each illustrate a comparison between a threshold and data about the alternative processing sector.
Figure 9B:
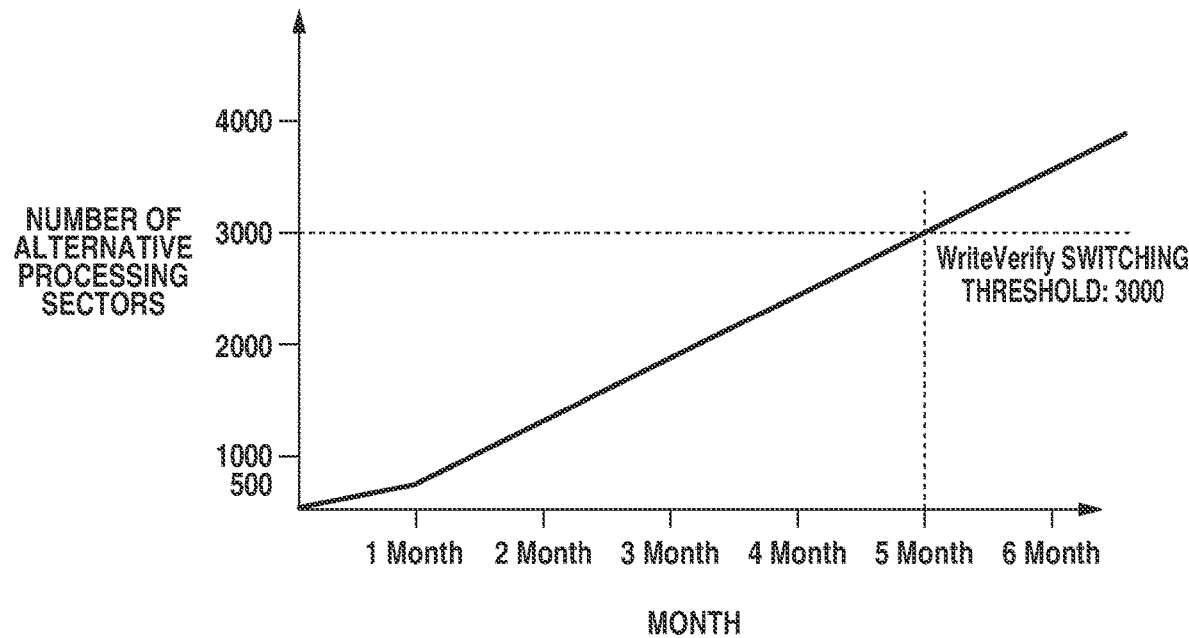

In FIG. 3, the "current value" represents a numeric value at a point in time when the SMART information 40 is acquired, the "worst value" represents a value that is the worst in the past SMART information, and the "threshold" represents a criterion in changing the write processing as illustrated in FIGS. 9A and 9B to be described below.

An item "alternative processing pending sector count" indicates the number of sectors determined to be unstable by the control unit 130 during the read processing. Specifically, when an error occurs in a normal sector during the read processing, the normal sector is stored into the NVRAM 133 as an alternative processing pending sector.

An item "alternative processing sector count" (the number of sectors already subjected to alternative processing) indicates the number of sectors replaced with other sectors (alternative sectors) by the alternative processing. The alternative processing sector is stored into the NVRAM 133, by occurrence of an error during the read processing for the alternative processing pending sector. The alternative processing sector refers to a bad sector already subjected to alternative processing.

An item "sector alternative processing occurrences count" indicates the number of occurrences of the alternative processing.

An item "uncorrectable sector count" indicates the number of bad sectors determined to be defective by the control unit 130 and the number of bad sectors that have failed to be processed as the alternative processing sector because of running out of the alternative sectors.

An item "load/unload count" indicates the number of times load/unload processing is executed. The control unit 130 increments this count when such processing is executed.

An item "power on/off count" indicates the number of times the HDD 115 is activated and the number of times the HDD 115 is deactivated. Upon receiving a command from the CPU 106, the control unit 130 determines the number of times the control unit 130 itself is activated and the number of times the control unit 130 itself is deactivated, and increments the count.

An item "power-on hour(s)" indicates the time during which power is supplied to the HDD 115.

An item "load time" indicates the duration of a state where the magnetic head 138 is present above the magnetic disk 139, i.e., a load state.

The RAM 132 stores, for example, cache data.

The head driving unit 135 controls the driving of the magnetic head 138 that reads and writes data.

The disk driving unit 134 controls the rotation of the magnetic disk 139.

The magnetic disk 139 has a plurality of sectors as a storage area. The details will be described below.

The control unit 130 handles a sector that has failed in the read processing, as the alternative processing pending sector, without immediately determining this sector to be a bad sector. The control unit 130 performs the read processing for the alternative processing pending sector again and handles this sector as a bad sector if this read processing is not normally performed. Further, processing in which the control unit 130 allocates the alternative sector to a bad sector when the bad sector occurs will be referred to as alternative sector processing. The NVRAM 133 stores the bad sector to which the alternative sector is allocated, as an alternative processing sector. The details will be described with reference to FIGS. 6A and 6B to be described below.

During the write processing, the magnetic head 138 stores data by generating a magnetic flux for a predetermined sector of the magnetic disk 139 and thereby magnetizing the sector. Further, during the read processing, the magnetic head 138 generates an electric current by a magnetic flux caused by a charge held by the magnetized sector.

The read-write signal processing unit 136 causes a magnetic flux corresponding to data in the magnetic head 138 during the write processing. Further, during the read processing, the read-write signal processing unit 136 determines logic information ("1", "0"), based on an electric current generated in the magnetic head 138.

The description will continue, returning to FIG. 2. The operation of the HDD 115 in activation processing for the information processing apparatus 200 will be described with reference to FIG. 2.

When the power is supplied to the HDD 115, the activation processing for the information processing apparatus 200 begins.

The control unit 130 executes initialization for driving the HDD 115, and then performs driving diagnosis for the head driving unit 135 and the disk driving unit 134.

When the control unit 130 determines that no trouble is found in the driving diagnosis, the control unit 130 drives the spindle motor 140 to rotate the magnetic disk 139. When the number of rotations of the magnetic disk 139 becomes stable, the control unit 130 detects the stability of the number of rotations.

When the control unit 130 detects the stability of the number of rotations, reading of data is enabled. The control unit 130 then drives the head driving unit 135 to move the magnetic head 138 to a position above the magnetic disk 139. The magnetic head 138 reads a system area saved in the magnetic disk 139, and the CPU 106 executes a system program stored in the HDD 115 and thereby performs the activation processing for the information processing apparatus 200.

Next, operation in each type of processing of the HDD 115 will be described with reference to FIG. 2.

The control unit 130 receives a SATA command from the HDD controller 114, via the SATA I/F 120 and the host I/F 131. Based on the SATA command received by the control unit 130 of the HDD 115, accessing or processing such as reading/writing of data is performed for a specific sector of the magnetic disk 139.

In this process, the control unit 130 operates the head driving unit 135 to perform processing for moving the magnetic head 138 from a home position located outside a surface of the magnetic disk 139 to a position above the magnetic disk 139, i.e., load processing. A state where the magnetic head 138 is present above the magnetic disk 139 will be referred to as a load state.

In the processing for reading data, based on an amount of charge held in a predetermined sector in the load state, an electric current corresponding to a magnetic flux between the magnetic head 138 and the sector flows through the magnetic head 138. Subsequently, based on the amount of the electric current flowing through the magnetic head 138, the read-write signal processing unit 136 determines the logic information ("1", "0"), as described above.

In the processing for writing data, a predetermined sector is magnetized by a magnetic flux generated by the magnetic head 138 in the load state, so that the sector holds a predetermined charge amount.

The control unit 130 receives information about a load maintenance time from the HDD controller 114, via the SATA I/F 120 and the host I/F 131. In a case where the load maintenance time has elapsed after a job accompanied by processing, such as reading, writing, or deletion of data for the magnetic disk 139, is completed, the control unit 130 executes processing for moving the magnetic head 138 to the outside of the surface of the magnetic disk 139 (to the home position). The series of operations is referred to as unload processing, and a state where the magnetic head 138 is at the home position is referred to as an unload state.

Further, when the spindle motor 140 is turned on, the control unit 130 updates the SMART information 40 stored in the NVRAM 133. Specifically, the control unit 130 increments the value of the load/unload count held in the SMART information 40. Furthermore, the control unit 130 transmits the updated SMART information 40 to the HDD controller 114, via the host I/F 131 and the SATA I/F 120.

Figure 4A:
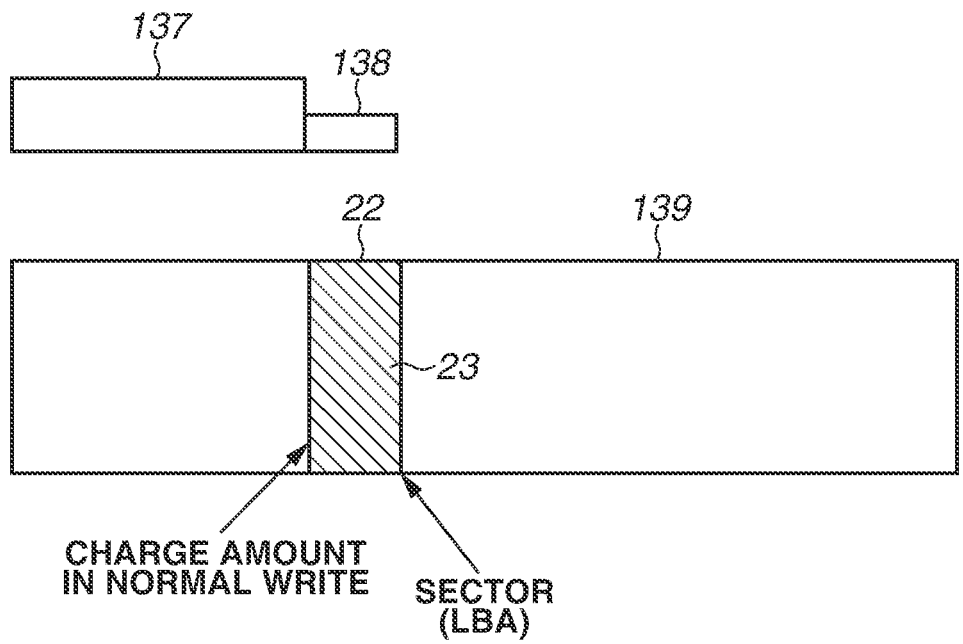
FIGS. 4A and 4B illustrate a state of a sector when regular write processing is executed and a state of a sector when WeakWrite processing is executed, respectively.
Figure 4B:
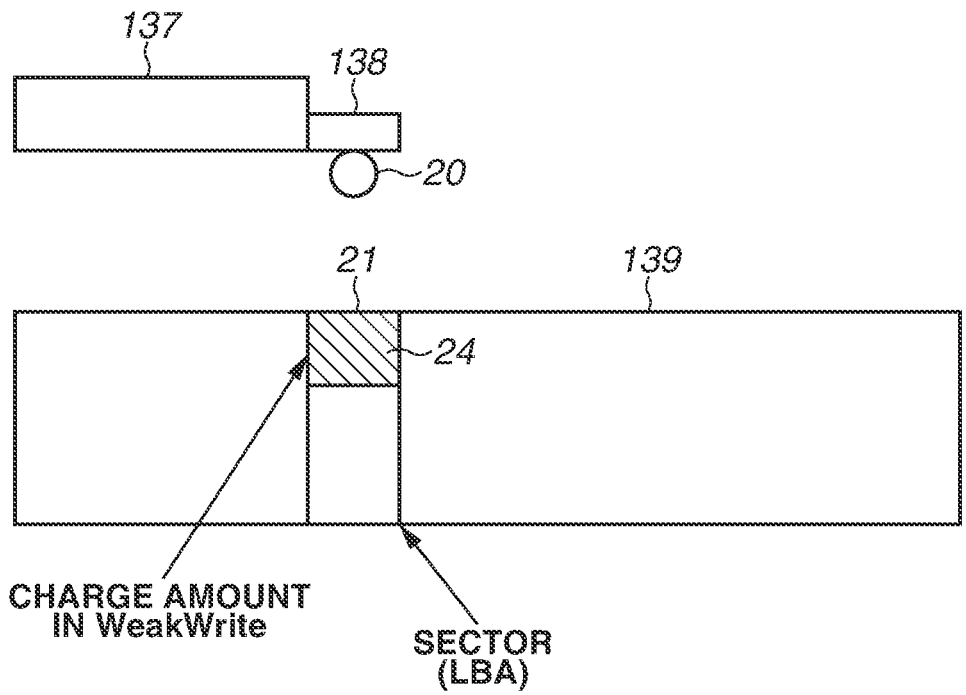

FIG. 4A illustrates a state of a sector when the write processing is normally executed, and FIG. 4B illustrates a state of a sector when the write processing is not normally executed.

In the write processing, a sector is magnetized by a magnetic flux generated by the magnetic head 138, and a charge amount based on the generated magnetic flux is held in the sector.

Each of a charge amount 23 and a charge amount 24 is a charge amount to be held in a sector when regular write processing is performed. The regular write processing is processing for performing the processing for writing data once.

The charge amount 23 in FIG. 4A is a charge amount in a case where the control unit 130 has normally executed the processing for writing data for a sector 22 of the magnetic disk 139. In FIG. 4A, the processing for writing data is executed for the sector 22 in a state where dust 20 is not attached to the magnetic head 138.

The charge amount 24 in FIG. 4B indicates a charge amount in a case where the control unit 130 has failed to normally execute the write processing for the same data for a sector 21 (WeakWrite).

The WeakWrite occurs when the processing for writing data in the sector 21 is performed in a state where the dust 20 is attached to the magnetic head 138 (an abnormal state). When the dust 20 is attached to the magnetic head 138, the amount of a magnetic flux received from the magnetic head 138 is reduced by the dust 20 in the sector 21. As a result, the charge amount 24 of the sector 21 is smaller than the charge amount 23 of the sector 22.

When the control unit 130 attempts to read the data of the sector 22 in which the data is held with the charge amount 24 at the time of the WeakWrite, an electric current flowing through the magnetic head 138 decreases if the charge amount 24 is not sufficient for accurate determination of the data. In that case, the logic information ("1", "0") cannot be correctly read and thus the data cannot be read. The sector from which the data has not been read is subjected to the alternative processing and is not accessed anymore, so that the number of the alternative sectors increases.

Figure 5:
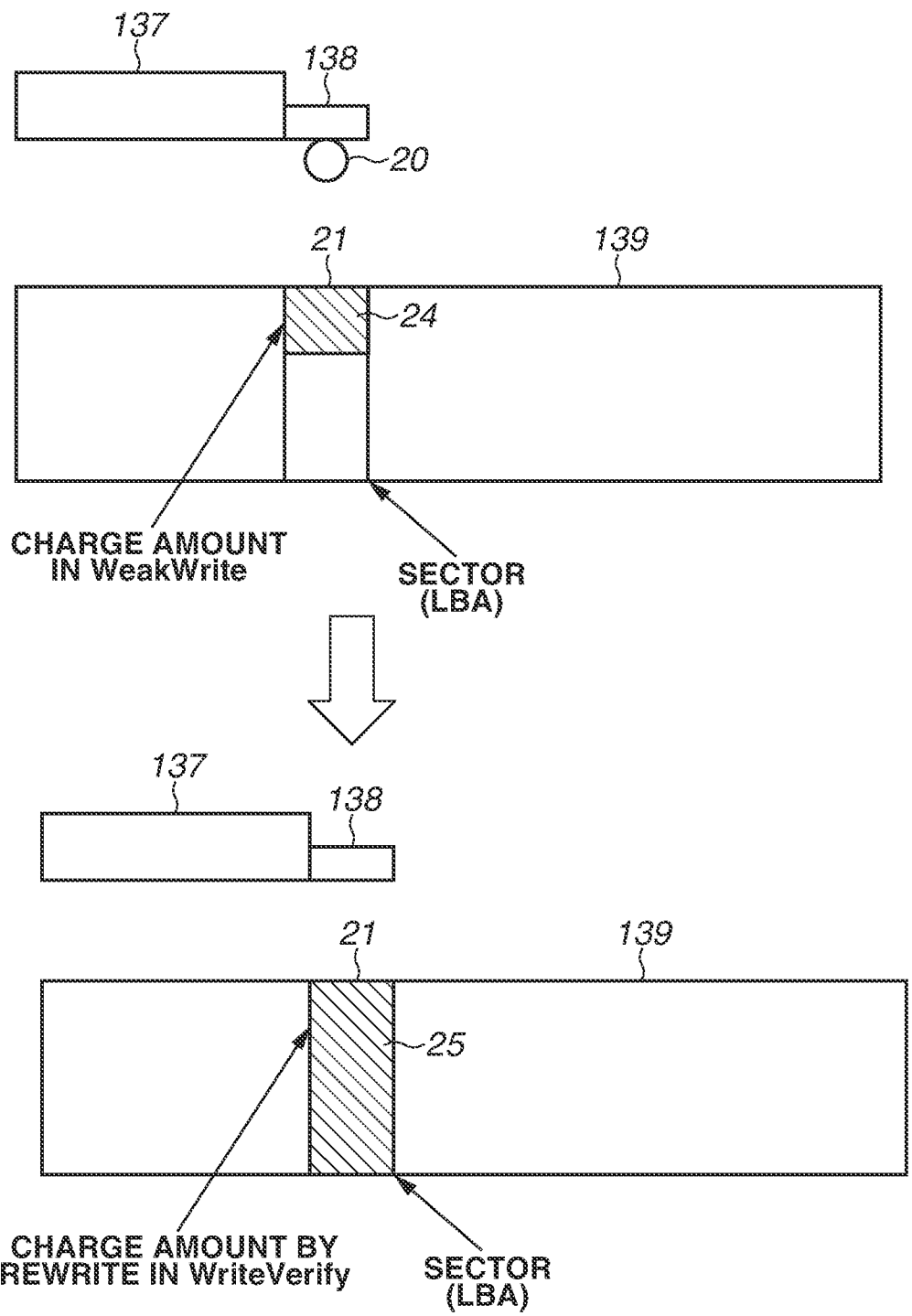
FIG. 5 is a diagram illustrating a state of a sector when WriteVerify processing is executed.

Next, FIG. 5 illustrates a charge amount when Write-Verify processing (hereinafter referred to as WriteVerify) is performed for the sector 21.

The WriteVerify is processing for executing the read processing for a predetermined sector after executing the write processing (first write processing) for the sector. Further, in a case where data cannot be normally read in the read processing, the write processing is additionally performed for the sector (second write processing).

Here, a case where the result of executing the first write processing is the state illustrated in FIG. 4B will be described as an example.

After performing the first write processing for the sector 21, the magnetic head 138 performs the read processing upon physically making one round (moving in one circle)

above the magnetic disk 139. Here, in the first write processing, normal data cannot be read because of the occurrence of the WeakWrite. Therefore, the second write processing is further performed. In the second write processing, the data that is the same as the data in the first write processing is written.

After the first write processing, the magnetic head 138 physically moves to perform the read processing, so that the dust 20 attached to the magnetic head 138 is removed. As a result, in the second write processing, the write processing can be performed in a state where dust is removed (a normal state), so that the normal write processing (writing of data with a sufficient charge amount 25 for the sector 21) is enabled.

Therefore, it is desirable to perform the WriteVerify when the information processing apparatus 200 stores an update of system information saved in the HDD 115 or user data into the HDD 115. Performing the WriteVerify enables writing for a sector with a sufficient charge amount and, therefore, an increase in the number of the bad sectors can be suppressed and the amount of usage of the alternative sectors can be suppressed.

The alternative sector processing will be described with reference to FIGS. 6A and 6B. The description will be provided assuming that the control unit 130 recognizes the alternative processing pending sector, the alternative processing sector, the normal sector, and the alternative sector, separately.

The alternative processing pending sector is a sector recognized by the control unit 130 as an unstable sector. The alternative processing sector is a sector recognized by the control unit 130 as a sector (a bad sector) from which data cannot be normally read and which has been subjected to the alternative processing. The alternative sector is a sector that has been handled by the control unit 130 as an alternative to the alternative processing sector in the alternative processing. The alternative sector is allocated beforehand as an alternative area.

The description will continue returning to FIGS. 6A and 6B. A case where a predetermined sector of the HDD 115 is in the state illustrated in FIG. 4B when the information processing apparatus 200 is in a standby state will be described as an example, with reference to FIGS. 6A and 6B.

When the HDD 115 is in the standby state, the control unit 130 executes the read processing for the sectors in the entire area of the magnetic disk 139. In other words, in FIG. 6A, the read processing is executed for the state in FIG. 4B. In this process, if the sector 21 from which data is to be read is in the state where the data cannot be read as normal data with the charge amount 24 of the sector 21 because of the WeakWrite, the control unit 130 registers the sector 21 in the SMART information 40, as the alternative processing pending sector.

Figure 6A:
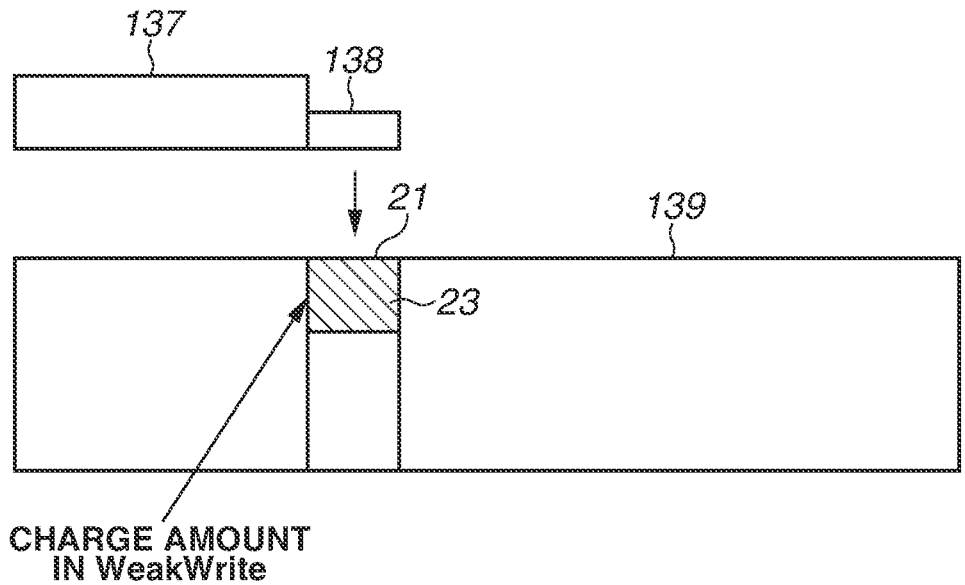
FIGS. 6A and 6B are diagrams illustrating alternative sector processing.
Figure 6B:
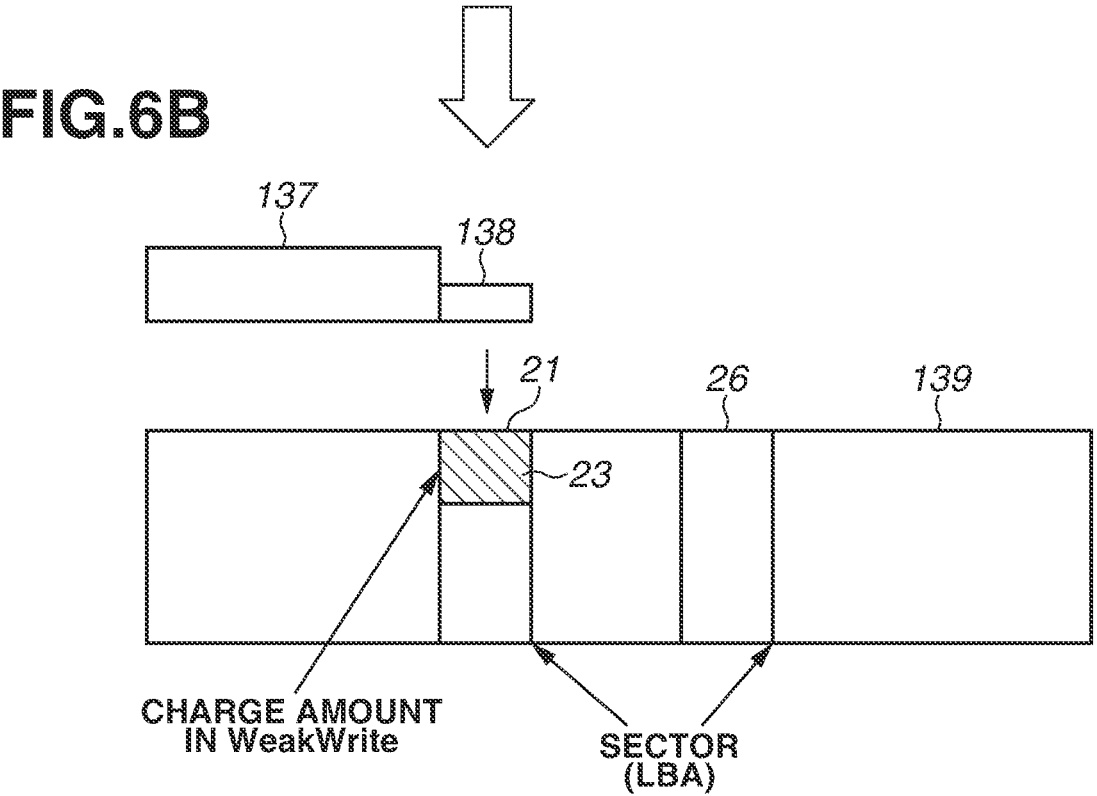

After the sector 21 has become the alternative processing pending sector in FIG. 6A, the control unit 130 executes the read processing for the sectors of the entire area (or for the alternative processing pending sector) of the magnetic disk 139, when the HDD 115 is in the standby state. In other words, in FIG. 6B, the read processing is executed for the state in FIG. 6A.

At this moment, if the read processing cannot be normally performed in the sector 21 that has become the alternative processing pending sector, the sector 21 is handled as a bad sector that needs the alternative processing. Subsequently, an alternative sector 26 is allocated to this bad sector, and this bad sector is registered in the SMART information 40 as the alternative processing sector that has been subjected to the alternative processing. From the next time, in a case where access to the sector 21 that has become the alternative processing sector occurs, the alternative sector 26 is accessed.

In a case where the read processing is normally performed as a result of performing the read processing for the state in FIG. 6A, the control unit 130 changes the recognition from the alternative processing pending sector to the normal sector and thereby updates the SMART information 40.

Figure 7:
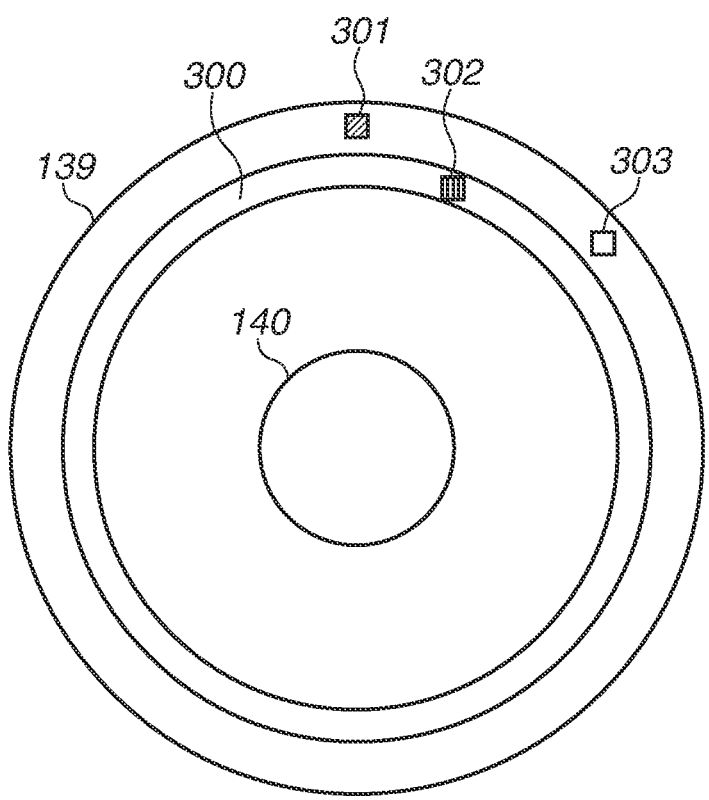
FIG. 7 is a diagram illustrating an alternative sector, an alternative processing pending sector, an alternative processing sector, and a normal sector.

FIG. 7 illustrates an alternative processing pending sector 301, an alternative sector 302, an alternative processing sector 303, and an alternative sector area 300, on the magnetic disk 139.

In a case where the control unit 130 writes data in the alternative processing pending sector and cannot read the data as normal data, the control unit 130 registers this sector as the alternative processing sector that indicates the sector as being a sector that has been subjected to the alternative processing, in the SMART information 40. In FIG. 7, the control unit 130 allocates the alternative sector 302 from the alternative sector area 300 as an alternative to the alternative processing sector 303.

Figure 8:
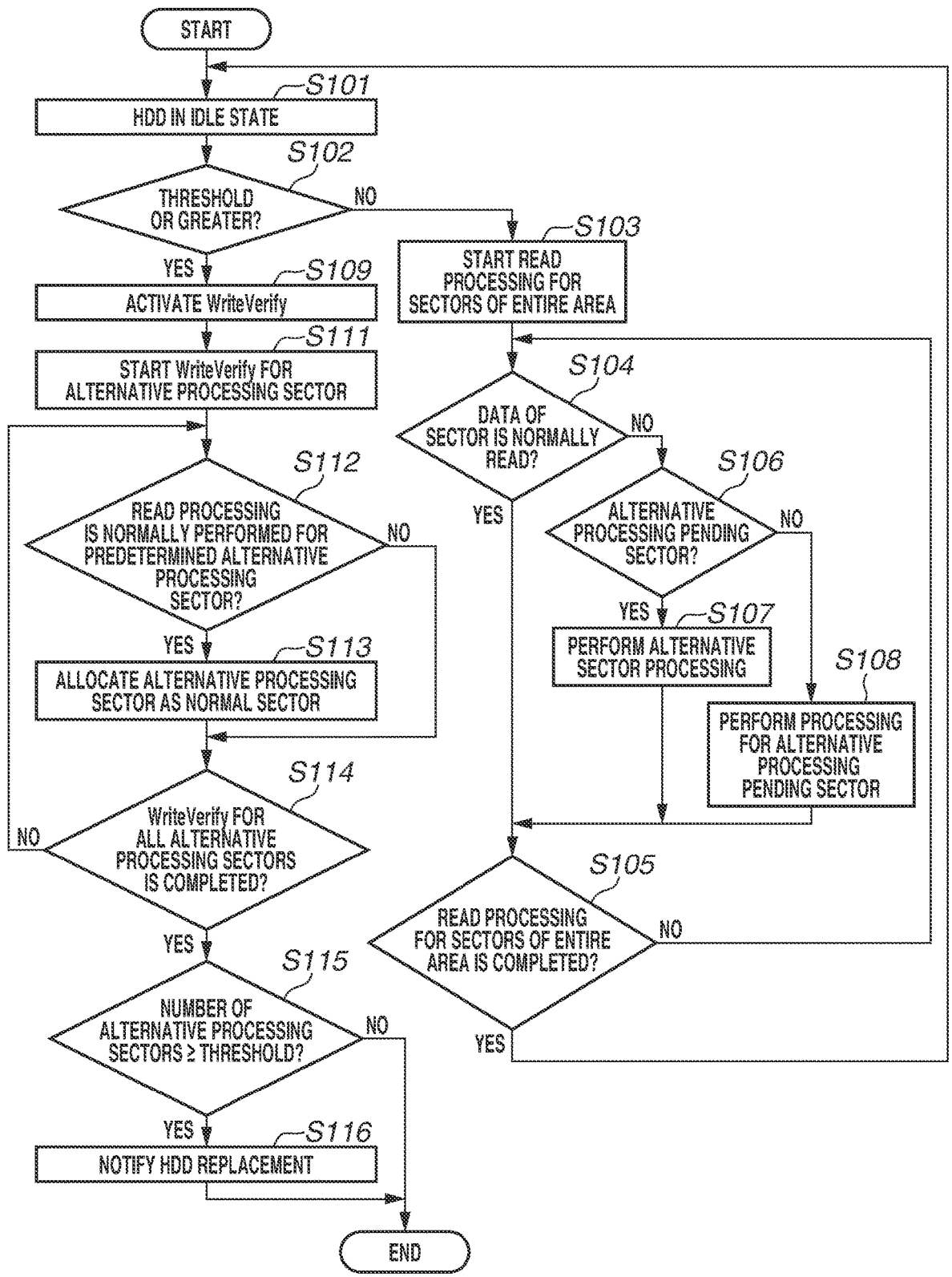
FIG. 8 is a flowchart of switching of write processing.

FIG. 8 illustrates a flowchart of switching of the write processing according to the first exemplary embodiment.

The description will be provided assuming that the control unit 130 performs the regular write processing when the flowchart begins.

In S101, when the information processing apparatus 200 enters the standby state, the system control controller 100 enters a standby state, and the HDD 115 enters the standby state (an idle state).

In S102, after the HDD 115 enters the standby state, the control unit 130 operates as follows. First, the control unit 130 acquires the SMART information 40 from the NVRAM 133. The control unit 130 then compares the number of the alternative processing sectors, included in the SMART information 40 or a calculation result obtained by using the number of the alternative processing sectors, and threshold information (a threshold) stored beforehand in the NVRAM 133. Here, an example in which the SMART information 40 is acquired immediately after the HDD 115 enters the standby state is described. However, the SMART information 40 may be acquired after a lapse of a predetermined period of time. The threshold information 40 may be stored in another storage device, such as the ROM 107, the SSD 105, or the HDD 115, instead of being stored in the NVRAM 133.

If the number of the alternative processing sectors or the calculation result is greater than or equal to the threshold (e.g., if the current state is an abnormal state where dust is likely to be attached to the magnetic head 138) (YES in S102), the operation transitions to S109.

If the number of the alternative processing sectors or the calculation result is less than the threshold (e.g., if the current state is a normal state where dust is not attached to the magnetic head 138) (NO in S102), the operation transitions to S103. The threshold information stored in the NVRAM 133 beforehand may be changeable by an operator.

Here, a method for such a comparison will be described with reference to a diagram of a comparison between the threshold and the data about the alternative processing sector, illustrated in FIGS. 9A and 9B. Here, two comparison methods will each be described as an example, but these examples are not limitative.

In each of FIG. 9A and FIG. 9B, a horizontal axis indicates the number of the operation months of the HDD 115, and a vertical axis indicates the number of the alternative processing sectors. The data represent the number of the sectors of each month included in the SMART information 40 acquired from the NVRAM 133.

First, FIG. 9A illustrates a comparison method for comparing an increasing rate of the alternative processing sectors for a predetermined period and the threshold.

In a configuration illustrated in FIG. 9A, the control unit 130 determines the abnormal state in a case where the following expression (1) is satisfied.

$$\text{Number of alternative processing sectors of } N+1 \text{ (Month)} - \text{Number of alternative processing sectors of } N \text{ (Month)} \geq \text{Threshold} \quad (1)$$

In other words, the control unit 130 calculates a difference between the number of the alternative processing sectors acquired from the SMART information 40 of a predetermined month and the number of the alternative processing sectors acquired from the SMART information 40 of a month immediately before the predetermined month. The control unit 130 then compares the calculated difference and the threshold. The control unit 130 determines the abnormal state if the increasing rate is greater than or equal to the threshold, and determines the normal state if the increasing rate is less than the threshold.

In the present exemplary embodiment, a case where the threshold is 2000 (the number of sectors/month) will be described as an example. Here, the predetermined period is 1 month, and the threshold is 2000 (the number of sectors/month), but these are not limitative.

In the configuration illustrated in FIG. 9A, the number of the alternative processing sectors of 0 month is 0, and the number of the alternative processing sectors of 1 month is 500. Based on the expression (1), 500−0<2000 is calculated and therefore, the control unit 130 determines that the normal state is established at 1 month.

Meanwhile, the number of the alternative processing sectors at 1 month indicates 500 sectors, and the number of the alternative processing sectors at 2 months indicates 3000 sectors. Based on the expression (1), 3000−500≥2000 is calculated and therefore, the control unit 130 determines that the abnormal state is established at 2 months.

Next, FIG. 9B illustrates a comparison method for comparing the number of the alternative processing sectors and the threshold.

In a configuration illustrated in FIG. 9B, the control unit 130 determines the abnormal state in a case where the following expression (2) is satisfied.

$$\text{Number of alternative processing sectors} \geq \text{Threshold} \quad (2)$$

The control unit 130 compares the number of the alternative processing sectors acquired from the SMART information 40 of a predetermined month and the threshold. In the configuration illustrated in FIG. 9B, the control unit 130 determines the abnormal state if the number of the alternative processing sectors is greater than or equal to the threshold, and determines the normal state if the number of the alternative processing sectors is less than the threshold.

In the present exemplary embodiment, the threshold indicates, for example, the number of the alternative processing sectors that is 3000, but this is not limitative.

In the configuration illustrated in FIG. 9B, the control unit 130 determines the normal state before 5 months and determines the abnormal state at 5 months.

One of the comparison method illustrated in FIG. 9A and the comparison method illustrated in FIG. 9B may be performed or both of these comparison methods may be performed. However, in a case where both of the comparison methods are performed, the operation transitions from S102 to S109 if the calculation result exceeds the threshold in at least one of these comparison methods. As for FIGS. 9A and 9B, a case is described where the comparison method illustrated in one of FIG. 9A and FIG. 9B is used.

With reference to FIG. 9A and FIG. 9B, the threshold is described to be set beforehand, but may be changeable by the operator.

The description will continue returning to FIG. 8.

In S102, if the control unit 130 determines that the number of the alternative processing sectors or the calculation result is less than the threshold (NO in S102), the operation transitions to S103.

In S103, the control unit 130 starts the read processing for all the sectors that are available as a storage area (the sectors of the entire area) on the magnetic disk 139. Upon completion of S103, the operation transitions to S104.

In S104, the control unit 130 performs the read processing for a predetermined sector, and determines whether data of this sector is normally read. If the data is normally read (YES in S104), the operation transitions to S105. For a sector from which data is not normally read, the control unit 130 writes data, and confirms whether this written data can be normally read. If the data is normally read (YES in S104), the control unit 130 determines that the sector is normal and the operation transitions to S105. If the data is not normally read (NO in S104), the operation transitions to S106.

In S106, the control unit 130 confirms whether the predetermined sector is set as the alternative processing pending sector, by accessing the NVRAM 133. If the predetermined sector is set as the alternative processing pending sector (YES in S106), the operation transitions to S107. If the predetermined sector is not set as the alternative processing pending sector (NO in S106), the operation transitions to S108.

In S107, the control unit 130 allocates the alternative sector to the predetermined sector, and sets this sector as the alternative processing sector (the alternative sector processing). Subsequently, the control unit 130 increments the number of the alternative processing sectors in the SMART information 40. The setting information about the alternative sector is stored into the NVRAM 133. Upon completion of S107, the operation transitions to S105.

In S108, the control unit 130 sets the predetermined sector to the alternative processing pending sector (processing for the alternative processing pending sector). The setting information about the alternative processing pending sector is stored into the NVRAM 133.

Upon completion of S108, the operation transitions to S105.

In S105, the control unit 130 confirms whether the read processing for the sectors of the entire area is completed. If the read processing is not completed (NO in S105), the operation transitions to S104 to continue the read processing, and the control unit 130 starts the read processing for the next sector.

If the read processing for the sectors of the entire area is completed (YES in S105), the operation transitions to S101, and the HDD 115 enters the standby state.

The description will continue returning to S102. If the control unit 130 determines that the number of the alternative processing sectors or the calculation result is greater than or equal to the threshold (YES in S102), the operation transitions to S109.

In S109, the CPU 106 activates the WriteVerify. In other words, the CPU 106 changes the setting from the regular write processing (the first write processing) to the Write- Verify (the second write processing). Information about this change is saved into the NVRAM 133. Upon completion of S109, the operation transitions to S111. The HDD 115 may enter the standby state upon completion of S109. In that case, the operation transitions to S111 at predetermined timing.

In S111, the control unit 130 starts the WriteVerify for the alternative processing sector.

In S112, the control unit 130 determines whether the read processing is normally performed in the WriteVerify for a predetermined alternative processing sector. If the read processing is normally performed (YES in S112), the operation transitions to S113. In S113, the control unit 130 allocates this alternative processing sector as the normal sector. Information about this change is saved into the NVRAM 133. Upon completion of S113, the operation transitions to S114.

On the other hand, if the read processing is not normally performed in the WriteVerify for the predetermined alternative processing sector (NO in S112), the operation transitions to S114. In other words, if the read processing is not normally performed in the WriteVerify for the predetermined alternative processing sector, the alternative processing sector remains as the alternative processing sector.

In S114, the control unit 130 confirms whether the WriteVerify for all the alternative processing sectors is completed. If the WriteVerify is not completed (NO in S114), the operation returns to S112, and the control unit 130 performs the WriteVerify for the next alternative processing sector. If the WriteVerify is completed (YES in S114), the operation transitions to S115.

In S115, the control unit 130 determines whether the number of the alternative processing sectors is greater than or equal to the threshold, by confirming the SMART information 40. If the control unit 130 determines that the number of the alternative processing sectors is greater than or equal to the threshold (YES in S115), the operation transitions to S116.

In S116, the CPU 106 displays an HDD replacement notification at the operation unit 101. The operator can thereby recognize that the life of the HDD 115 is about to end.

If the control unit 130 determines that the number of the alternative processing sectors is less than the threshold (NO in S115), the flowchart of the switching of the write processing ends. Here, there is described the configuration in which if the control unit 130 determines that the number of the alternative processing sectors is less than the threshold, the flow ends while maintaining the change of the write processing to the WriteVerify. However, some embodiments have a different configuration. For example, the flow may end upon changing the write processing from the WriteVerify to the regular write processing when the control unit 130 determines that the number of the alternative processing sectors is less than the threshold in S115.

As described above, according to the present exemplary embodiment, switching between the WriteVerify and the regular write processing can be performed at optimum timing, so that the performance of the HDD and the life of the HDD can be compatible.

In the first exemplary embodiment, switching from the regular write processing to the WriteVerify is performed based on the comparison between the number of the alternative processing sectors or the calculation result obtained by using the number of the alternative processing sectors and the threshold. A second exemplary embodiment is different in that the load/unload count and a threshold are compared.

In the present exemplary embodiment, portions having functions similar to those in FIG. 1 to FIG. 9B are provided with the same reference numerals as these drawings and thus will not be described in detail.

Figure 10:
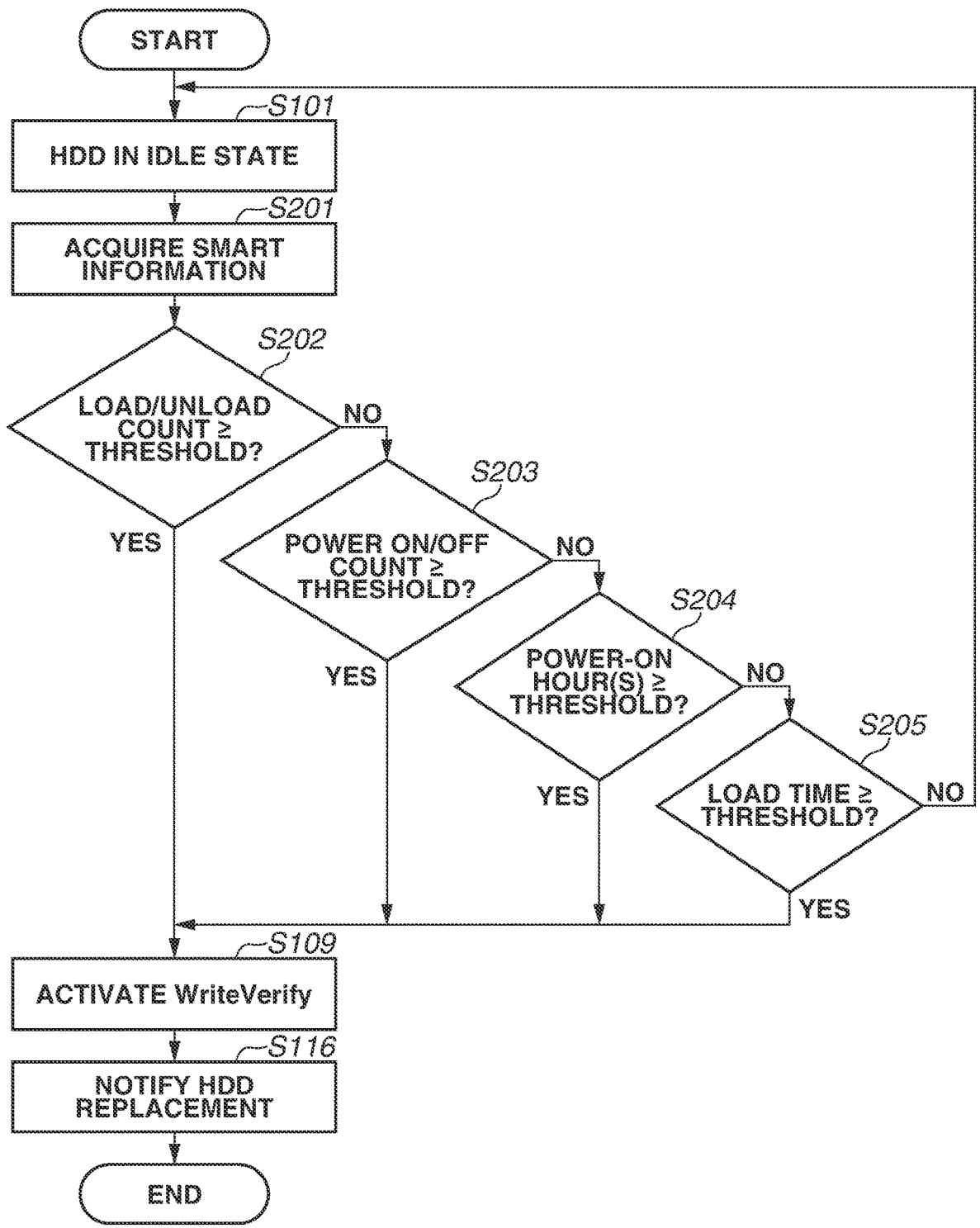
FIG. 10 is a flowchart of switching of write processing.

FIG. 10 illustrates a flowchart of switching of the write processing in the second exemplary embodiment.

In S101, when the HDD 115 enters the idle state, the operation transitions to S201. The transition to S201 may occur immediately after the HDD 115 enters the idle state or may occur after a lapse of a fixed period of time.

In S201, the control unit 130 acquires the SMART information 40 from the HDD 115. Upon completion of S201, the operation transitions to S202.

In S202, the control unit 130 reads out the load/unload count from the SMART information 40 stored in the NVRAM 133, and compares the read-out load/unload count with a threshold stored in the NVRAM 133. If the load/unload count is greater than or equal to the threshold (YES in S202), the operation transitions to S109. Upon completion of S109, the operation transitions to S116. The description of these operations is similar to that in the first exemplary embodiment and thus will be omitted.

If the load/unload count is less than the threshold (NO in S202), the operation transitions to S203.

In S203, the control unit 130 reads out the power on/off count from the SMART information 40 stored in the NVRAM 133, and compares the read-out power on/off count with a threshold stored in the NVRAM 133. If the power on/off count is greater than or equal to the threshold (YES in S203), the operation transitions to S109. If the power on/off count is less than the threshold (NO in S203), the operation transitions to S204.

In S204, the control unit 130 reads out the power-on hour(s) from the SMART information 40 stored in the NVRAM 133, and compares the read-out power-on hour(s) with a threshold stored in the NVRAM 133. If the power-on hour(s) is greater than or equal to the threshold (YES in S204), the operation transitions to S109. If the power-on hour(s) is less than the threshold (NO in S204), the operation transitions to S205.

In S205, the control unit 130 reads out the load time from the SMART information 40 stored in the NVRAM 133, and compares the read-out load time with a threshold stored in the NVRAM 133. If the load time is greater than or equal to the threshold (YES in S205), the operation transitions to S109. If the load time is less than the threshold (NO in S205), the operation transitions to S101.

As described above, according to the present exemplary embodiment, switching between the WriteVerify and the regular write processing can be performed at optimum timing, so that the performance of the HDD and the life of the HDD can be compatible.

Other Exemplary Embodiments

Various examples and exemplary embodiments have been described above, but some embodiments are not limited to the specific description in the present specification.

Some embodiments can also be implemented by supplying a program that implements one or more functions of the above-described exemplary embodiments to a system or apparatus via a network or storage medium, and causing one or more processors in a computer of the system or apparatus to execute processing by reading out the program. Some embodiments can also be implemented by a circuit (e.g., an application-specific integrated circuit (ASIC)) for implementing one or more functions.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that the some embodiments are not limited to the disclosed exemplary embodiments. The scope of the following claims is to be accorded the broadest interpretation so as to encompass all such modifications and equivalent structures and functions.

This application claims the benefit of Japanese Patent Application No. 2018-143936, filed Jul. 31, 2018, which is hereby incorporated by reference herein in its entirety.

What is claimed is:

1. An information processing apparatus including a hard disk, the information processing apparatus comprising:
a storage unit configured to store at least Self-Monitoring, Analysis and Reporting Technology (SMART) information of the hard disk, the SMART information including a number of replaced sectors;
a determination unit configured to compare first data and a threshold corresponding to the first data and thereby determine whether the first data is greater than or equal to the threshold, the first data being the number of replaced sectors or being based on the number of replaced sectors;
a setting unit configured to set first write processing for writing second data in the hard disk, or second write processing for writing the second data in the hard disk and reading data that is written by writing of the second data; and
a change unit configured to change the write processing set in the setting unit,
wherein the change unit changes the write processing set in the setting unit from the first write processing to the second write processing, based on determination that the first data is greater than or equal to the threshold by the determination unit.

2. The information processing apparatus according to claim 1, wherein the second write processing rewrites the second data in the hard disk, based on failing to normally read the written data.

3. The information processing apparatus according to claim 1, further comprising an execution unit configured to execute the write processing set in the setting unit,
wherein the execution unit executes the second write processing for all of the replaced sectors, based on changing from the first write processing to the second write processing by the change unit, and the storage unit stores each of the replaced sectors from which the written data is normally read, as a normal sector.

4. The information processing apparatus according to claim 1, further comprising a readout unit configured to perform readout for all sectors that are available as a storage area of the hard disk, based on determination that the first data is less than the threshold by the determination unit.

5. The information processing apparatus according to claim 4, wherein the storage unit
stores a sector from which data is not normally read among sectors for which readout is executed by the readout unit, as an alternative processing pending sector, and
stores an alternative processing pending sector for which readout is executed by the readout unit and from which data is not normally read among sectors each stored in the storage unit as an alternative processing pending sector, as a replaced sector.

6. The information processing apparatus according to claim 1,
wherein the first data is the number of sectors.

7. The information processing apparatus according to claim 1, further comprising a calculation unit configured to calculate an increasing rate of sectors in a predetermined period,
wherein the calculation unit calculates the increasing rate of the sectors in the predetermined period, based on a respective number of sectors at a plurality of points in time, and
wherein the first data is the increasing rate calculated by the calculation unit.

8. The information processing apparatus according to claim 7,
wherein each of the plurality of points in time is a respective month of each year, and
wherein the predetermined period is one month.

9. The information processing apparatus according to claim 1, further comprising a notification unit configured to notify an operator of replacement of the hard disk,
wherein the notification unit notifies the replacement of the hard disk, based on the first data being greater than or equal to the threshold.

10. The information processing apparatus according to claim 1, further comprising a print unit configured to print image data on a sheet.

11. The information processing apparatus according to claim 1, further comprising a reading unit configured to generate image data by reading at least one document.

12. The information processing apparatus according to claim 1, wherein the first write processing is processing in which the data that is written based on writing of the second data is not read.

13. The information processing apparatus according to claim 1, wherein each of the replaced sectors is a sector replaced with another sector.

14. An information processing apparatus including a hard disk, the information processing apparatus comprising:
- a storage unit configured to store at least Self-Monitoring, Analysis and Reporting Technology (SMART) information of the hard disk, the SMART information including first data being a power on/off count of the hard disk;
- a determination unit configured to compare the first data and a threshold corresponding to the first data and thereby determine whether the first data is greater than or equal to the threshold;
- a setting unit configured to set first write processing for writing second data in the hard disk, or second write processing for writing the second data in the hard disk and reading data that is written by writing of the second data; and
- a change unit configured to change the write processing set in the setting unit,
- wherein the change unit changes the write processing set in the setting unit from the first write processing to the second write processing, based on determination that the first data is greater than or equal to the threshold by the determination unit.

15. The information processing apparatus according to claim 14, wherein the second write processing rewrites the second data in the hard disk, based on failing to normally read the written data.

* * * * *